(12) United States Patent
Yamakado et al.

(10) Patent No.: US 6,247,348 B1
(45) Date of Patent: Jun. 19, 2001

(54) APPARATUS FOR AND METHOD OF TESTING DYNAMIC CHARACTERISTICS OF COMPONENTS OF VEHICLE

(75) Inventors: Makoto Yamakado, Tsuchiura; Toshihiko Horiuchi, Ushiku; Takao Konno, Ibaraki-ken; Wataru Yamagishi, Abiko, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/054,391

(22) Filed: Apr. 3, 1998

(30) Foreign Application Priority Data

Apr. 4, 1997 (JP) .................................................. 9-086272

(51) Int. Cl.$^7$ .................................................. G01M 13/00
(52) U.S. Cl. .............................. 73/11.04; 73/117; 73/118
(58) Field of Search .................... 73/11.04, 117, 73/124, 128, 118

(56) References Cited

U.S. PATENT DOCUMENTS 5,488,859 * 2/1996 Britt ........................................ 73/121
5,942,673 * 8/1999 Horiuchi et al. .................... 73/11.04

OTHER PUBLICATIONS

Japanese Patent Unexamined Publication No. 6–249753.
U.S. Application serial No. 09/019,117, filed on Feb. 5, 1998, (your Ref.500.36031X00).

* cited by examiner

Primary Examiner—Benjamin R. Fuller
Assistant Examiner—Jewel V. Thompson
(74) Attorney, Agent, or Firm—Antonelli, Terry, Stout & Kraus, LLP (57) ABSTRACT

Measured values obtained from a running test of an object to be tested and a module on a test bench such as a flat belt type chassis dynamo, and computation based upon numerical models of components other than the object to be tested and the module, are related to each other so as to reproduce a condition near to an actual running condition, for the object to be tested and the module so as to precisely analyze how the object to be tested and the module affects upon the motion of the overall vehicle during actual running of the vehicle. Thus it is possible to evaluate dynamic characteristics of respective vehicle components and a module which relate to the maneuvering performance of the vehicle, on a test bench in a condition in which a load variation and an alignment variation are taken into consideration.

10 Claims, 8 Drawing Sheets

APPARATUS FOR AND METHOD OF TESTING DYNAMIC CHARACTERISTICS OF COMPONENTS OF VEHICLE

BACKGROUND OF THE INVENTION

The present invention relates to an apparatus for and a method of testing-running characteristics of a part of a vehicle as an object to be tested on a test bench.

Related Art

A flat belt type chassis dynamo has been proposed in order to evaluate the maneuvering stability of the vehicle, instead of a conventional drum type chassis dynamo. For example, Japanese Patent Unexamined Publication No. 6-249753 discloses a method wherein support parts are provided, corresponding to wheels of the vehicle, on the upper surfaces of movable parts which can be swung by first hydraulic jacks actuated independent from one another, and which can be swung widthwise of the vehicle by second hydraulic jacks actuated independent from one another, and flat belts making contact with the wheels of the vehicle are provided respectively to the support parts, the movable parts being inclined so as to reproduce a climbing slope and a ramp and the support parts being inclined so as to variously change ground contact conditions of the wheels of the vehicle so as to reproduce various disturbances exhibited by the road surface, thereby precisely testing the maneuverability of the vehicle in various road surface conditions over a wide range.

Dynamic load variation occurs at each of wheels of a vehicle during acceleration or turning during actual running of vehicle, in addition to static load variation caused by a climbing slope or a ramp as mentioned above. For example, during acceleration, loads at rear wheels become larger, while during deceleration, loads at front wheels become larger, and during turning, loads at outer wheels become larger. These occur irrespective of a load configuration such as a flat road or a ramp. During acceleration, an inertia force is exerted to the gravitational center of the vehicle while a drive force is exerted to the ground contact points of the tires, and accordingly, moments are generated around the pitching axis. Load displacement from the front wheels to the rear wheels occurs, corresponding to forces balancing the above-mentioned pitching moments. Similarly, a centrifugal force is exerted to the gravitational center of the vehicle during turning while a cornering force is exerted to a ground contact point, and accordingly, a rolling moment is effected. A displacement of a load from an outer wheel to an inner wheel occurs, corresponding to a force balancing with the rolling moment.

Further, the wheels stroke vertically while they are guided by suspension links. Since the links have a limited length, the alignment with respect to the road surface is always changed as the wheels stroke.

The variation in load and variation in the alignment intricately influence upon each other so as to excessively affect the friction forces between the tires and the road surfaces, and are influence factors which are not negligible for analyzing the maneuverability of the vehicle, in particular abrupt changes in maneuvering.

Further, in the case of testing a vehicle on actual running, variations in the attitude of the vehicle continuously affect constraint conditions with respect to inputs to the four wheels. However, in the case of testing a suspension for a single wheel as a module, influence caused by variation in the attitude of an overall vehicle cannot be taken into account, that is, it has been impossible to evaluate how the suspension for a single wheel affects the maneuvering of an overall vehicle.

SUMMARY OF THE INVENTION

One object of the present invention is to provide an apparatus for testing dynamic characteristics of a vehicle component, that is, a part of a vehicle to be tested, and a module, which can be evaluated and analyzed on a test bench, in consideration with a variation in load and a variation in alignment during running of the vehicle.

In a method of causing respective functional components of a vehicle, which relate to the maneuvering performance of a vehicle, as an object to be tested, to reproduce, on a test bench, a condition in consideration with variation in load and variation in alignment, which occur during actual running of a vehicle, it is required to subject a dummy chassis on which functional components and a module are installed, to an attitude change or a load variation by forces represented by an inertia force upon acceleration and a centrifugal force upon turning during actual running of a vehicle, and accordingly, it is also required to adjust these forces in accordance a load variation and an alignment variation resulting therefrom.

Thus, according to one aspect of the present invention, there is provided a vehicle component dynamic test apparatus for testing running characteristics of respective vehicle components relating to maneuvering performances of a vehicle, and a module on a test bench, comprising a frame, a dummy chassis supported by a plurality of actuators connected to the frame, for setting up thereon components including at least one wheel, a dummy road surface simulating a road surface on which the vehicle runs, reaction force measuring means for measuring a reaction force produced when the wheel among the components makes contact with the dummy road surface, an attitude measuring means for measuring an attitude of the dummy chassis with respect to the frame, control means for the actuators, control means for the dummy road surface, numerical model storage means for storing numerical models of the vehicle on which the above-mentioned components will be installed, and a digital computer for computing an attitude of the vehicle and a load applied to the road surface from each of wheels of the vehicle, from a measured reaction force value measured by the reaction force measuring means and the numerical models stored in the numerical model storage means, and for delivering instruction signals to the control means for the actuators and the control means for the dummy road surface so as to decrease a difference between the attitude of the dummy chassis measured by the attitude measuring means and the calculated attitude, and a difference between a load applied to the dummy road surface, which is computed from a reaction force of the wheel corresponding to the component to be tested, which has been measured by the reaction force measuring means, and a load applied to a road surface by the wheel.

Further, in such a case that the number of wheels, constituted by the number of functional components and the number of modules is smaller than the number of wheels of a vehicle on which the functional components and the module are installed, there may be provided a digital computer for computing an attitude of the vehicle and loads applied to a road surface by the wheels from a preset test condition, a measured reaction force measured by the reaction force measuring means, and the numerical models stored in the numerical model storage means.

Further, the reaction force measuring means preferably measures a reaction force from decomposed components longitudinal, crosswise and vertical with respect to the dummy road surface.

Further, if the reaction force measuring means measures a longitudinal component from the dummy road surface, a rotational displacement about a rotary axis crosswise of the dummy road surface may preferably be applied to the dummy chassis by the actuators.

Further, if the reaction force measuring means measures a crosswise component from the dummy road surface, a rotational displacement about a rotary axis longitudinal of the dummy road surface may preferably be applied to the chassis by the actuators.

Further, the attitude measuring means may computes an attitude of the dummy chassis from displacements of the actuators, which are measured by actuator displacement sensors incorporated in the actuators.

Further, the dummy road surface may preferably be composed of a flat-belt type chassis dynamo, and the reaction force measuring means may measure a longitudinal reaction force of the dummy road surface as a value which is computed from rotational data including a rotational inertia of the flat-belt type chassis dynamo, an absorbing/generating torque, a rotational speed, an angular acceleration of a motor/generator for driving the chassis dynamo.

Further, in a dynamic test method for vehicle components, according to the present invention, a part of a vehicle including at least a wheel is supported, as an object to be tested, on a dummy road surface means simulating a road surface, through the intermediary of the actuators, and the attitude of the object to be tested is changed by the actuators so as to carry out the test.

Further, a dynamic test method for vehicle components, according to the present invention, comprises the steps of supporting a dummy chassis by a plurality of actuators connected to a frame, supporting a part of a vehicle as an object to be tested, which includes at least a wheel, to the dummy chassis, computing an attitude of the vehicle and a load applied to a road surface from the wheel from a reaction force applied by the object to be tested, to a dummy road surface means simulating the road surface, and numerical models of the vehicle, which have been previously prepared, and controlling the actuators and the motion of the dummy surface means so as to decrease a difference between the attitude of the dummy chassis and the computed attitude of the vehicle and a difference between the load applied from the wheel of the dummy chassis to the dummy road surface means and the computed load applied from the wheel to the road surface so as to test the object to be tested.

According to the present invention, a component to be tested can be evaluated in consideration with a load variation of a tire and an alignment variation, and accordingly, a performance test substantially the same as that carried out by actually running the vehicle can be carried out on a test bench. Accordingly, it is possible to analyze an influence which the component applies to the dynamic performance of the vehicle such as, a traction performance, a turning performance, a decelerating performance or the like of the vehicle, in particular, an abrupt behavioral variation, which has to take a load variation and an alignment variation into consideration.

Explanation will be made of preferred embodiments of the present invention with reference to the drawings in which:

DESCRIPTION OF PREFERRED
EMBODIMENTS OF THE INVENTION

Referring to FIGS. 1 to 14, embodiments of the present invention will be hereinbelow explained.

Figure 1:
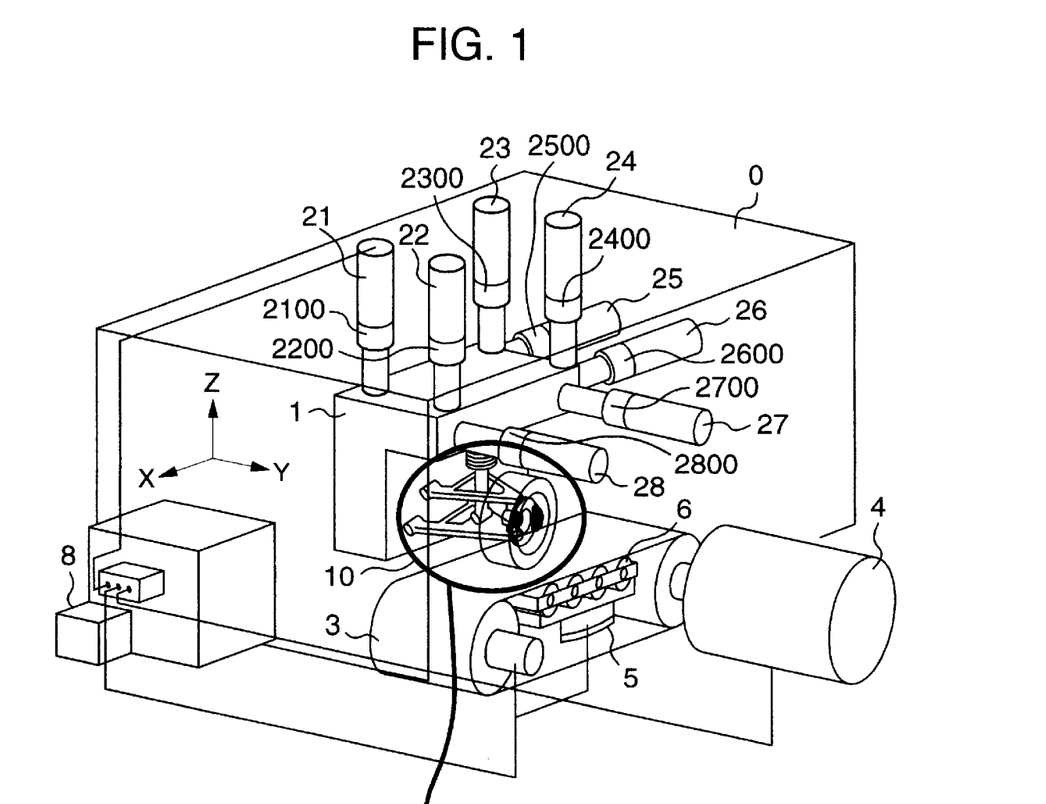
FIG. 1 is a schematic view illustrating an overall arrangement of a first embodiment of the present invention.

At first, referring to FIG. 1, explanation will be made of the overall structure of a first embodiment of the present invention. In this embodiment, a test of a front wheel assembly, and in particular, a test of a brake characteristic of a front left wheel will be explained. In order to avoid complication in the figure, signal lines and the like are shown at a minimum. Further, in the description which will be made hereinbelow, the wording "module" will be explained as the one which is composed of a plurality of components in combination.

A dummy chassis 1 is connected to a frame 0 which is rigidly fixed to the ground surface, by means of actuators 21, 22, 23, 24, 25, 26, 27, 28 which are incorporated thereto with displacement sensors which deliver displacements of the actuators to a digital computer 7. These actuators apply forces to the dummy chassis 1 in accordance with actuator drive signals computed by the digital computer 7 so as to allow the dummy chassis 1 to take an optional attitude. That is, the chassis 1 can move in the X-axial, Y-axial and Z-axial directions, and as well can rotate (yawing) about the X-axis, the Y-axis and the Z-axis. In joint parts among the actuators, the dummy chassis 1 and the frame 0, there are used joints such as static pressure joints which can effect restraint only in a direction in which a force is applied. Such a static pressure joint is an abbreviation of a joint having a plurality of static pressure bearings, and is adapted to support a shaft-like member by a static fluid pressure while serving as a joint.

In this embodiment, the frame 0 has a box structure in a building shape Further, the X-axial, Y-axial and Z-axial directions are taken as shown.

Figure 1A:
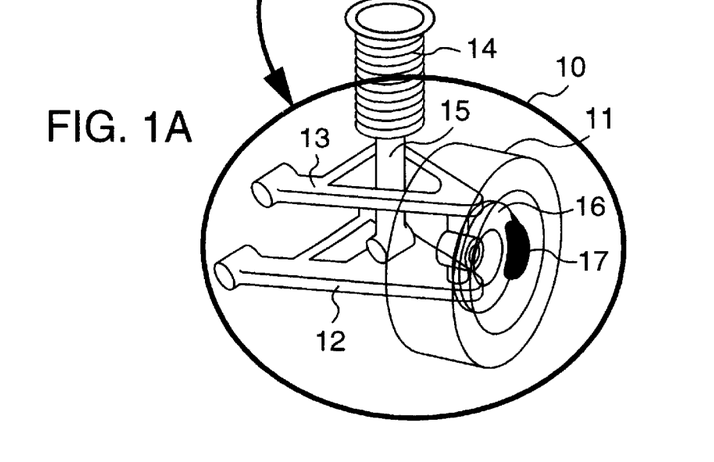
FIG. 1a is an enlarged view illustrating an essential part shown in FIG. 1.

In this embodiment, the dummy chassis 1 is incorporated thereto with a front left wheel assembly 10. The front left wheel assembly 10 has components such as an arm, a spring, a damper and the like which will be mounted to a monocock body of a vehicle in actual installation, and which are mounted, in this embodiment, to the dummy a chassis 1. FIG. 1A is an enlarge view which shows a front left wheel assembly 10 in detail. The front left wheel assembly 10 is composed of a tire 11, a lower arm 12, an upper arm 13, a spring 14, a damper 15, a brake disc 16 and a brake caliper 17. Referring to FIG. 1, in order to clearly understand the structure around the front left wheel assembly 10, parts which are located behind the tire 11 and the like so as to be actually invisible are shown by solid lines.

A flat belt 3 is also provided, serving as a dummy load means facing the tire 11, for simulating a road surface. The flat belt 3 is driven and braked by a motor generator 4 for generating and absorbing a power. A roller unit 6 for bearing a load, and a load measuring device 5 for measuring a load which the roller unit 6 bears, are provided in rear of the flat belt. Further, the flat belt incorporates axial force detecting means 31, 32 for detecting forces widthwise of the flat belt, that is, axial forces of rollers for driving the flat belt (refer to FIG. 2). A reaction force measuring means is composed of the above-mentioned axial force measuring means 31, 32, and the load detecting device 5.

The digital computer 7 receives data of displacement of the actuators for determining (measuring) an attitude of the dummy chassis, and data of reaction forces (components in the X-axial, Y-axial and Z-axial directions) measured by the reaction force measuring means. The digital computer 7 computes an attitude variation of a vehicle to be tested, and a load variation from data of attitude of the dummy chassis as an initial value of the attitude of the vehicle to be tested, and a reaction force measured by the reaction force measuring means, with the use of numerical models of a vehicle on which the module to be tested will be installed. The numerical models are stored in a numerical model storage means 8. Further, the digital computer 7 compares an attitude variation of the vehicle to be tested, and a load variation which have been thus computed, with data of the attitude of the dummy chassis 1 and data of reaction forces (components in the X-axial, Y-axial and Z-axial directions) measured by the reaction force measuring means, and delivers signals for controlling the actuators so as to decrease the differences therebetween.

In this arrangement, as the numerical model storage means 8, any of various kinds of disc devices using magnetic media, and a memory device such as a semiconductor memory including a RAM and ROM can be used.

For example, if some of the actuators, such as, the actuators 21, 22, 23, 24 are extended by an equal length, the dummy chassis 1 is displaced in the negative Z-axial direction. This corresponds to such a condition that the loading weight is increased in an actual vehicle. Forces in the negative Z-axial direction are applied to the lower arm 12, the upper arm 13, the spring 14 and the damper 5, and simultaneously, the tire 1 is applied with a reaction force from the flat belt 3. When these forces are balanced with one another, the vertical displacement of the tire is stopped. The upper and lower arms are links each having a finite length, and accordingly, the angles (camber, tow and caster) of the tire 11 varies with respect to the flat belt 3 as the tire 11 is vertically displaced. That is, this is the so-called alignment variation. Further, when the actuators 21, 22, 23, 24 are extended by different lengths, respectively, the dummy chassis 1 is no longer laid in parallel with the flat belt 3, but the alignment complicatedly varies with respect to the flat belt 3. This is similar to complicated alignment variation which can be experienced in an actual vehicle running condition.

The dummy chassis 0, the flat belt 3 and the motor 4 are driven in accordance with a test mode. If the front left wheel assembly 10 is a module having a driving force (an engine and a drive shaft are not shown), a generated power is consumed as a power for driving the front left wheel assembly 10 as a rotating system, the flat belt 3 and the motor 4. On the contrary, when the front left wheel assembly 10 effects braking, the rotational energy of the rotary system of the front left wheel assembly 11, and of the flat belt 3 and the motor 4 is converted into a thermal energy by the brake.

The actuators incorporate displacement detectors (2100, 2200, ..., 2800), for measuring an absolute attitude and an attitude variation of the dummy chassis 0. As mentioned above, the behavior of the dummy chassis 0 is controlled so as to decrease the difference between the motion of the dummy chassis 0 and that of an actual vehicle on which the front left wheel assembly 10 will be installed, that is, by measuring the motion of the dummy chassis 0, dynamic characteristics of a vehicle to be tested, can be measured, and dynamic characteristics such as a compliance characteristic of transient suspension in consideration with an influence from the over all vehicle can be measured from the test bench from various measured physical values such as variation in the stroke of the front left wheel assembly 10 (measuring instruments are not shown).

Figure 2:
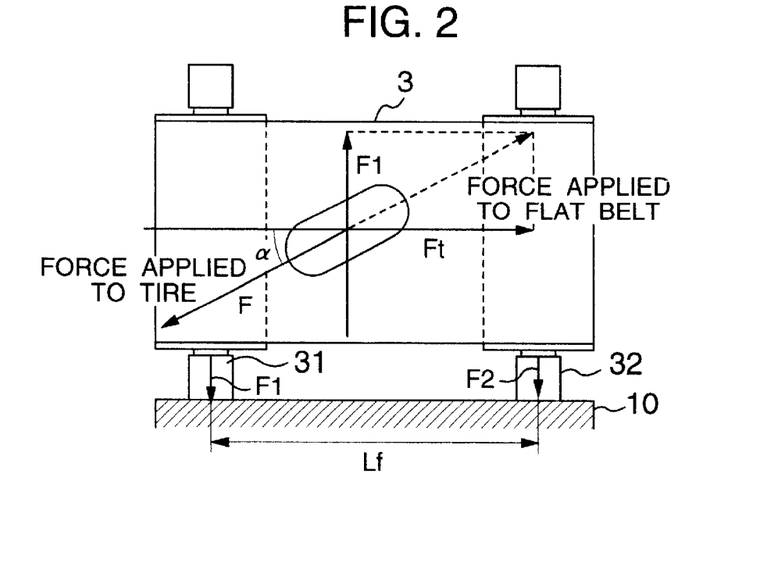
FIG. 2 is a schematic view showing a technique for measuring a force applied to a flat belt from a vehicle.

The flat belt 3 incorporates an axial force detecting means for detecting a force in the axial direction (the direction of the drive axis). FIG. 2 is a view for explaining measurement of a tire crosswise force and a tire traction force through axial detection as to axial force detecting means 31, 32 for the flat belt 3. In a condition shown in FIG. 2, the tire rotates having a slip angle α with respect to the advancing direction of the flat belt 3. When the flat belt exerts a force F to the tire, the flat belt 3 receives a force equal to the force F as a reaction force. This reaction force can be decomposed into an advancing component Ft in the advancing direction of the flat belt 3 and an axial component Fa. The force Ft is absorbed by the motor generator for driving the flat belt. If the inertial moment of the overall system of the flat belt is known, the force Ft can be obtained from revolution data such as a rotational speed of the flat belt or an angular acceleration thereof. The axial component Fa is measured by the axial force detecting means 31, 32 fixed between a shaft and the frame 10. If measured values F1, F2 are detected by the axial force detecting means 31, 32, the axial component Fa is given by the following formula:

$$Fa = F1 + F2 \qquad \text{(Formula 1)}$$

Further, if the inter-axial distance is set to Lf, the following formula is obtained:

$$Tm = Lf \times |F1 - F2| \qquad \text{(Formula 2)}.$$

By using this formula, a moment Tm which is exerted to the flat belt 3 by the tire can be obtained. Further, the flat belt 3 incorporates the roller unit 6 and the load measuring device for measuring a load which the roller unit 6 bears. The axial force detection means 31, 32 and the load measuring device 5 constituting the reaction force measuring means are composed of strain gage type load cells. One end thereof is connected to the roller unit 6 and the other end thereof is connected to the frame 0. A force applied to the flat belt 3 by the front left wheel assembly can be measured by the load measuring device 5.

Thus, in operating conditions for the dummy chassis 1 and the front left wheel assembly 10, by measuring forces applied-to the flat belt 3 by the tire, a force and a moment which are inputted to the dummy chassis 1 through the tire 11 can be measured.

In the first embodiment of the present invention, only the front left wheel is tested as a module, being made into contact with the flat belt 3, the input to the dummy chassis 0 is made through only one wheel. During actual running of a vehicle, forces received by four wheels from a road surface, are transmitted to the chassis of the vehicle. However, in the case of rectilinear running of the vehicle, forces received by the left and right wheels are considered to be equal to each other, and can be estimated from date of vehicle weights, weight distribution among the front and rear, dimensions of left and right wheels, a drive system, a wheel base, front and rear treads, suspension links and the like in view of a testing condition and data of reaction force through one wheel. Explanation will be hereinbelow made of variation in load and attitude of the vehicle during actual running, and then, a method according to the present invention will be detailed.

Figure 3:
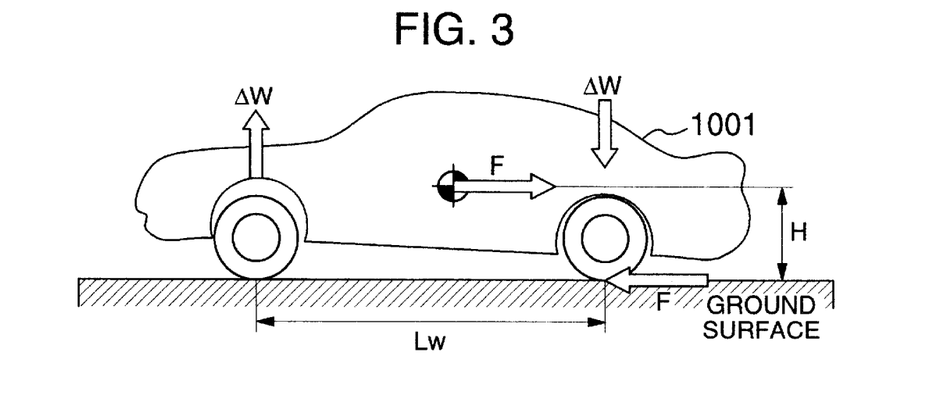
FIG. 3 is a view showing a force balance upon acceleration of a vehicle during actual running.

FIG. 3 is a view showing a shift of a load from the front wheel to the rear wheel upon rectilinear acceleration of a vehicle 1001. When the vehicle 1001 having a mass M accelerates at acceleration g, a reaction force applied to the tire from the ground surface is exhibited by:

$$F=M*a \quad \text{(Formula 3)}$$

Further, an inertia force F equal to the reaction force is applied to the gravitational center of the vehicle having a height H from the ground, and these forces effects a moment about the pitch axis of the vehicle 0, exhibited by:

$$Tp=F*H \quad \text{(Formula 4)}$$

In the case of a front wheel drive vehicle, the point of application of a reaction force from a road surface is present at the front wheel, the pitch moment applied to the vehicle can be also exhibited by Formula 4. A load is shifted from the front wheel to the rear wheel in order to balance with the pitch moment. The degree $\Delta W$ of the load shift is exhibited by:

$$\Delta W=F*H/Lw \quad \text{(Formula 5)}$$

where Lw is a wheel base (It is noted that the above-mentioned expression exhibits a total value as to the left and right wheels).

Accordingly, the load Wf of the front wheels (two front wheels) is exhibited by:

$$Wf=Wf0-\Delta W \quad \text{(Formula 6)}$$

where Wf0 is a static load of the front wheels. Thus, in the case of the front wheel drive vehicle, the load of the drive wheel is decreased from the static load Wf0.

The load Wr of the rear wheels (two wheels) is exhibited by:

$$Wr=Wr0+\Delta W \quad \text{(Formula 7)}$$

where wf0 is a static road of the front wheel, and Wr0 is a static load of the rear wheels. Accordingly, in the case of the rear wheel drive, the load of the drive wheel is increased from the static load Wr0.

The load Wt of the drive wheel closely relates to a friction force between a tire and a road surface, that is, a traction limit.

Figure 4:
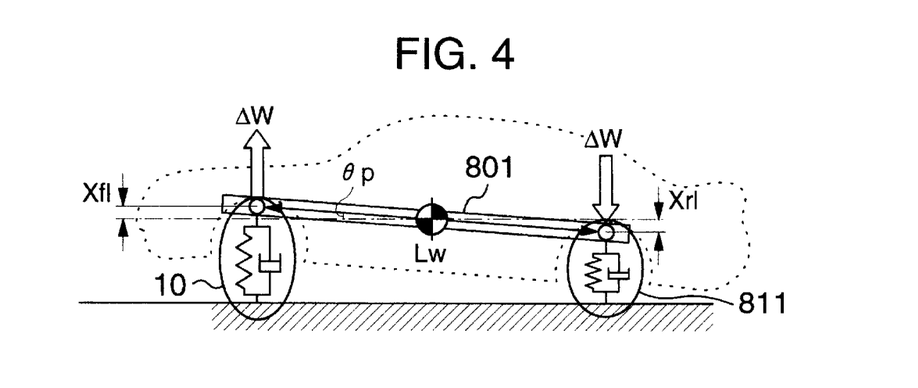
FIG. 4 is a view showing displacements on the front and rear wheel sides in dependence upon a longitudinal load variation.

FIG. 4 shows the attitude variation in such a case that load variation occurs at the front and rear wheels. For the sake of brevity, all link systems and suspension systems are exhibited by spring elements and damping elements, and the vehicle body is exhibited by a beam having a length Lw. Now estimating that a displacement Xf1 upward from a balance position occurs on the front wheel side while a displacement Xr1 downward from a balance position occurs on the rear wheel side when load variation—$\Delta W$ occurs on the front wheel side and variation $+\Delta W$ occurs on the rear wheel side, a pitch angle $\theta p$ is exhibited by:

$$\theta p=\text{Arcsin }(Xf1+Xr1)/Lw \quad \text{(Formula 8)}$$

which can be calculated. When the pitch angle is effected, alignment variation caused by a suspension stroke occurs. This also closely relates to the traction limit. In a vehicle having a large engine output power and a low traction limit, the drive force overcomes a maximum friction force between the tire and the road surface so as to cause racing, and accordingly, acceleration which can satisfy the engine output power can not be made. This causes such a fact that vehicles even having an equal output power and an equal weight, have different starting acceleration characteristics.

Figure 5:
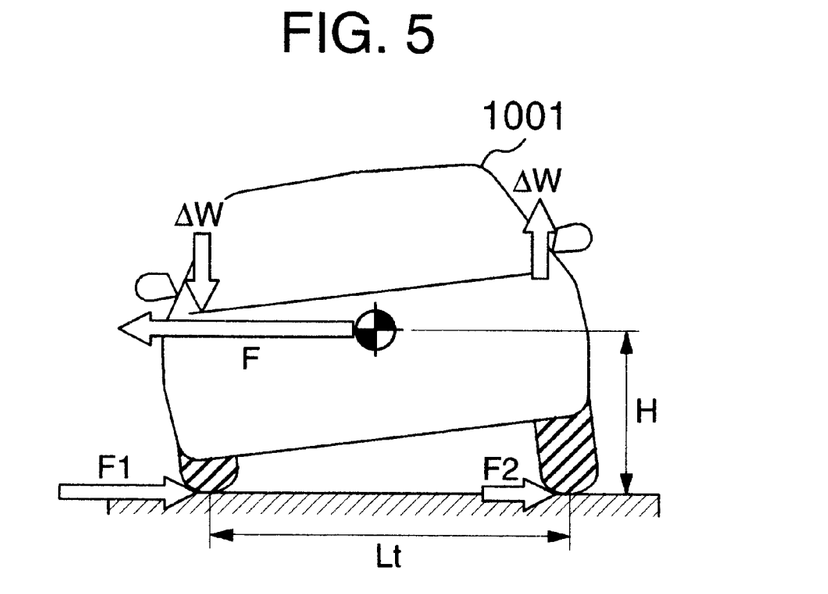
FIG. 5 is a view showing a force balance upon turning of a vehicle.

FIG. 5 is a front projection view which shows a balance of forces upon turning (left turning) of the vehicle 1001, at the position of the gravitational center of the vehicle 0. However, in this condition, the distribution of the front and rear weights is set to 50:50 for the sake of brevity. Since a centrifugal force is exerted to the gravitational point having a height H from the ground surface while a cornering force is exerted to the ground contact point, these forces are given a moment around the rolling axis of the vehicle 1001, which is exhibited by the following formula:

$$Tr=F*H \quad \text{(Formula 9)}$$

The load shift from the left wheel to the right wheel occurs so as to balance this rolling force.

Estimating that front and rear treads are equal to each other, the load shift $\Delta W$ is exhibited by the following formula:

$$\Delta W=F \times (H/Lt) \quad \text{(Formula 10)}$$

where Lt is the value of the treads. It is noted here that the load shift $\Delta W$ exhibits the sum of load shifts of the left and right wheels.

As a result, the load at the right tire of the vehicle is given by the following formula:

$$Wcr=Wr+\Delta W \quad \text{(Formula 11)}$$

and the load at the left tire of the vehicle is given by the following formula:

$$Wcl=Wl-\Delta W \quad \text{(Formula 12)}$$

where Wr is a right wheel load in a static condition, and w1 is a left wheel load in a static condition.

Figure 6:
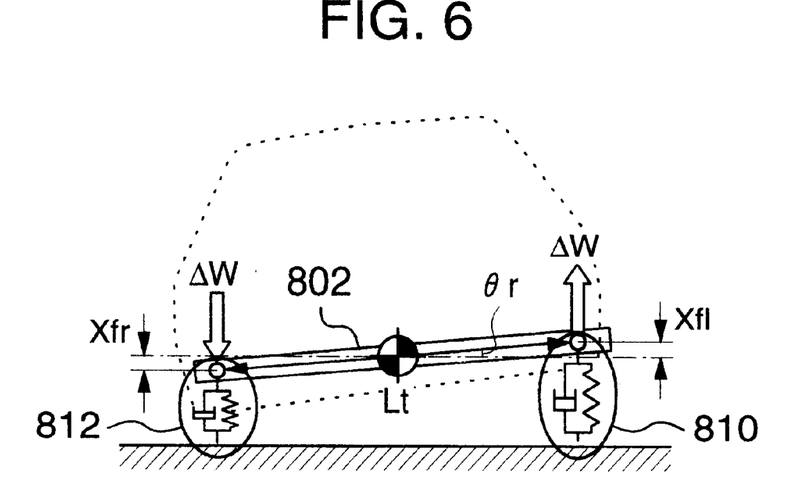
FIG. 6 is a view showing displacements on left and right wheel sides with respect to a lateral load variation.

FIG. 6 shows an attitude variation in such a case that load variation occurs on the front and rear sides. For the sake of brevity, all link systems and suspension systems are exhibited by spring elements and damping elements, and the vehicle body is exhibited by a beam having a length Lt. Now estimating that a displacement Xf1 upward from a balance position occurs on the front right wheel while a displacement Xr1 downward from a balance position occurs on the front left wheel when load variation $-\Delta W$ occurs on the right wheel and variation $+\Delta W$ occurs on the left wheel, a roll angle $\theta r$ is exhibited by:

$$\theta p = \text{Arcsin } (Xf1+Xr1)/Lt \qquad \text{(Formula 8)}$$

which can be calculated. The loads of the wheels closely relate to a friction characteristic between a tire and a road surface, that is, a cornering characteristic. Further, a roll occurs due to an inertia force applied to the vehicle body, alignment variation caused by suspension stroke occurs. This fact also closely relates to the cornering characteristic.

Formulae 3 to 7 show that loads of the wheels can be calculated from vehicle dimensions when an acceleration in an advancing direction of the vehicle is determined. Formula 8 shows that the pitch angle can be calculated. Formulae 9 to 12 show that loads of the wheels can be calculated from vehicle dimensions when an acceleration crosswise of the vehicle is determined. Further, Formula 13 shows that a roll angle of the vehicle body can be calculated.

In an embodiment of the test apparatus according to the present invention, computed values with the use of numerical models as to components of a vehicle other than those to be tested and the module, and measured values as to the components to be tested and the module in a running test on a test bench such as a flat belt type chassis dynamo are related to each other so as to reproduce a condition near to an actual running condition, for the components to be tested and the module. Accordingly, it is possible to precisely analyze how the components to be tested and the module affect the maneuvering of the overall vehicle during actual running. Next, explanation will be made of an embodiment of a test method according to the present invention, for relating computed values from numerical models, to measured values as to components to be tested and a module in a running test on a test bench such as a flat belt type chassis dynamo.

In this embodiment, the front left wheel assembly 10 is that of a four wheel drive vehicle, and the dummy chassis 1 is set up in such a condition that an engine, a transmission and the like are installed on the vehicle, in order to test dynamic characteristics such as starting or acceleration during rectilinearly running of the vehicle. This condition is typical, and in the case of a rear wheel drive vehicle, it can be considered that the drive force for the front wheels becomes zero while in the case of a front wheel drive vehicle, it can be considered that the drive force for the rear wheels becomes zero. In this embodiment, in the case of the rear wheel drive vehicle, the drive of the flat belt 3 is controlled by the digital computer 7 on the basis of test conditions, and the front left wheel assembly 10 is driven, as a driven wheel, by the flat belt 3. Further, for the sake of brevity, it is considered that load variation at the left and right wheels can be neglected.

When the tire 11 rotates the flat belt by a power from the engine, a rotational speed and an acceleration of a flat belt are measured, and are used for computing an acceleration of a vehicle on which the engine, the transmission and the front left wheel assembly 10 will be installed. The dummy chassis 1 is applied thereto with a force with which the dummy chassis 1 is to be advanced, but is restrained by the actuators which are driven under the control of the digital computer 7. This computation made by the digital computer 7 utilizes numerical models of a vehicle to be tested, on which the module to be tested is installed. These numerical models are specifically, a vehicle weight, a rotating inertia and the like, and are stored in the numerical model storage means 8. With the use of thus computed drive force, a longitudinal load variation can be computed. This load variation is delivered to the digital computer 7 as an input for a virtual rear wheel suspension assembly model 811 (refer to FIG. 4) which is one of the numerical models stored in the numerical model storage means 8, and which is determined from a rear wheel static load, dimensions of suspension, spring constants of springs, and damping coefficients of dampers. The digital computer 7 computes how the stroke of a virtual rear wheel suspension which is in the form of a numerical computer model, varies depending upon load variation. Further, alignment variation of a suspension tire can also be computed from a numerical model of a suspension arm or the like. Accordingly, a rear wheel drive force can be computed.

During running, the resultant of the front wheel drive force and the rear wheel drive force accelerates the vehicle. Accordingly, it is required to compute again the above-mentioned procedures (computation of load variation, suspension alignment and the like) from the above-mentioned resultant force. Further, on the basis of the thus computed attitude of the vehicle, the attitude (pitching) of the dummy chassis 1 can be reproduced with the use of the actuators. When the vehicle pitches, a displacement of the height of gravitational center occurs so that compensation therefor is also required. Further, in the rotary system, a force substantially equal to the rear wheel drive force should be applied to the flat belt type chassis dynamo.

Figure 7:
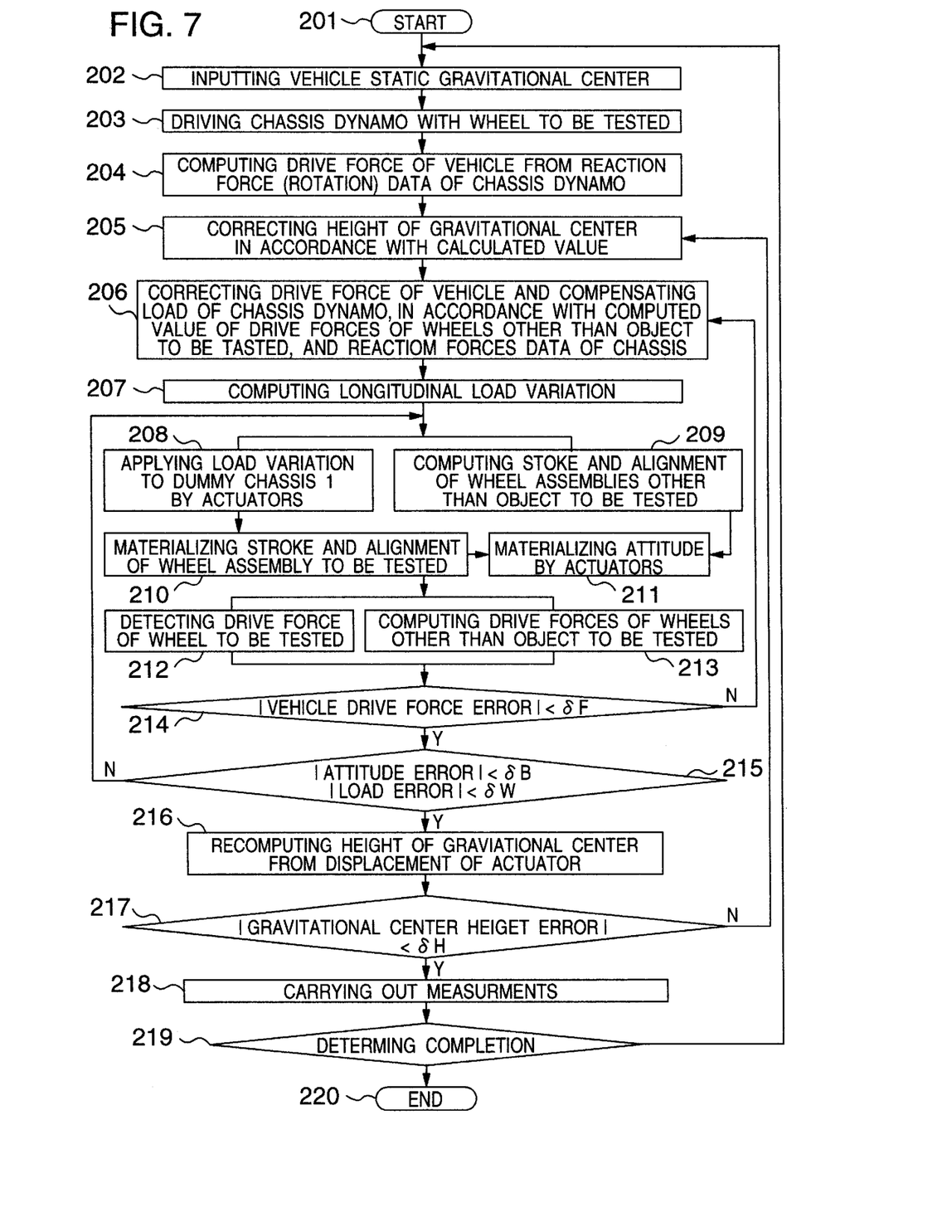
FIG. 7 is a flow-chart for an acceleration test carried out by a component and module dynamic test apparatus in the first embodiment of the present invention.

Flows of the above-mentioned events complicatedly react with one another, and accordingly, it requires to irritate computation and compensation as clearly understood form FIG. 7. Next, with reference to FIG. 7, explanation will be made of a test method according to the present invention, step by step.

(1) Start (step 201)

(2) Inputting a vehicle static gravitational center as positional data, into the digital computer 7, and simultaneously applying a static load of a wheel to be tested (in this embodiment, the front left wheel) stored in the numerical model storage means 8, to the dummy chassis 1 by means of the actuators (step 202);

(3) Driving the chassis dynamo with the wheel to be tested (step 203);

(4) Computing a torque produced by the wheel to be tested, from rotating data of the chassis dynamo, and reaction force data, and computing a drive force of the front wheel from this torque (step 204);

(5) Correcting the height of the gravitational center in accordance with a calculated value of the dynamic gravitational center (step 205);

(6) Computing arithmetic drive forces (torque) of the wheels other than the wheel to be tested (in this embodiment, the rear wheels), and a torque produced from the wheel to be tested, from rotating data of the chassis dynamo to be rotated by the wheel to be tested and reaction force data, and computing a drive force of the vehicle from the resultant of these forces, and further, reducing the load of the chassis dynamo by values corresponding to the computed drive forces (toques) of wheels other than the wheel to be tested (in this embodiment, rear wheels (step 206);

(7) Computing a longitudinal load variation with the use of wheel base data and the like stored in the numerical model storage means 8, by means of the digital computer 7;

(8) Applying a load to the dummy chassis 1 by the actuators (step 208);

(9) Computing a stoke (Xr1, refer to FIG. 4) and an alignment from data as to spring elements, damping elements of the virtual suspension, which are stored in the numerical model storage means 8 by means of the digital computer 7 (step 209);

(10) Materializing the stroke (Xf1, refer to FIG. 4) and the alignment of the wheel assembly to be tested (step 210);

(11) Materializing the attitude (a pitch angle based upon Formula 8 by means of the actuators (step 211);

(12) Detecting a drive force of the wheel to be tested with respect to the attitude materialized at step 211 (212);

(13) Computing drive forces of wheels other than the wheel to be tested, with respect to the attitude materialized at step 211 from data as to the virtual suspension and tires, stored in the numerical model storage means, by means of the digital computer 7;

(14) Comparing an error between the initial load and the resultant drive force obtained through steps 212, 213, with a predetermined reference value δF (step 214);

(15) Comparing an error between the initial load and the load variation (can be detected by the load measuring device 5) obtained by step 208 and applied to the dummy chassis 1, with a predetermined reference value δW, and by comparing an error between the original attitude of the vehicle and the attitude of the dummy chassis 1 obtained at step 211 with a predetermined reference value δB (step 215);

(16) Computing an attitude of the vehicle from displacements of the actuators detected by the displacement detectors incorporated in the actuators, and computing again the height of the gravitational center of the vehicle body (step 216);

(17) Comparing an error between the initial height of the gravitational center of the vehicle body and the recomputed height of the gravitational center of the vehicle body, with a reference value δH (step 217);

(18) Carrying out measurements (at this point, the irritation of computation and correction have been completed, and accordingly, the assembly to be tested is operated in a condition near to an actual running condition of the vehicle) (step 218);

(19) Determining completion (step 219); and (20) End (step 220).

The determination of completion is made by determining whether a predetermined time has elapsed or not, or whether a rest signal is delivered to the vehicle dynamic test apparatus or not.

Figure 8:
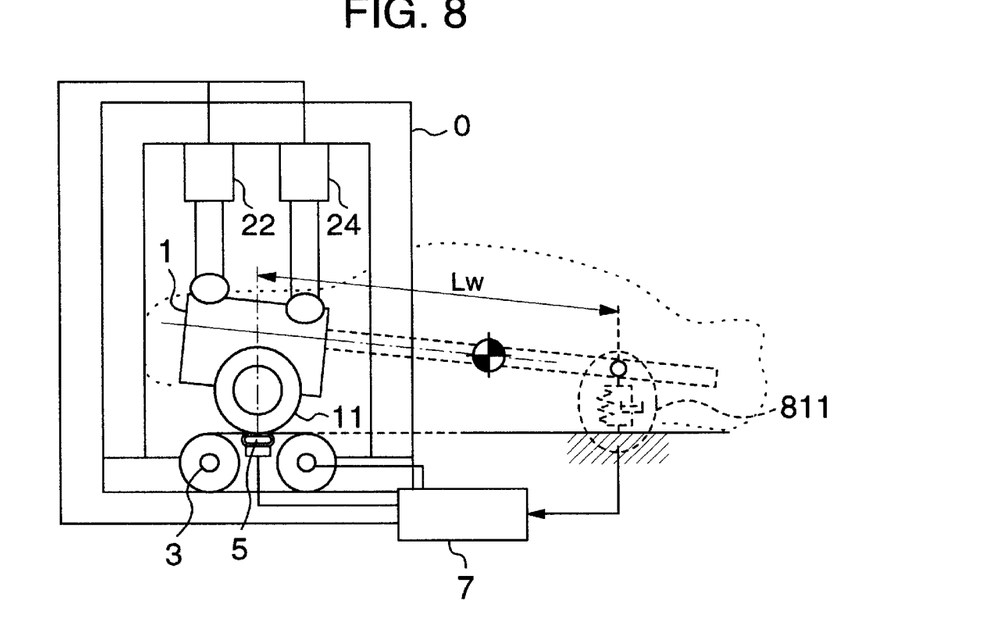
FIG. 8 is a view showing a behavior of a vehicle upon acceleration in a condition in which the component and module dynamic test apparatus in the first embodiment of the present invention is operated.

FIG. 8 shows an accelerating test condition in the test apparatus according to the present invention. The dummy chassis 1 is suspended from the frame 0 by actuators 22, 23, 24, 25 (actuators 23, 25 are invisible in this figure, and further, in order to avoid complication, only actuators for carrying out a pitch displacement are shown),.

The tire 11 of the front left wheel assembly 10 confronts the flat belt 3, and a ground contact load thereof can be detected by the load measuring device 5. The load and the attitude are reproduced by steps (1) to (20), and various measurements for the front left wheel 10 can be carried out. At this time, the load becomes smaller than the static front wheel load, and accordingly, the dummy chassis 1 is inclined upward and forward when advancing is made in the positive X-axial direction.

Figure 9:
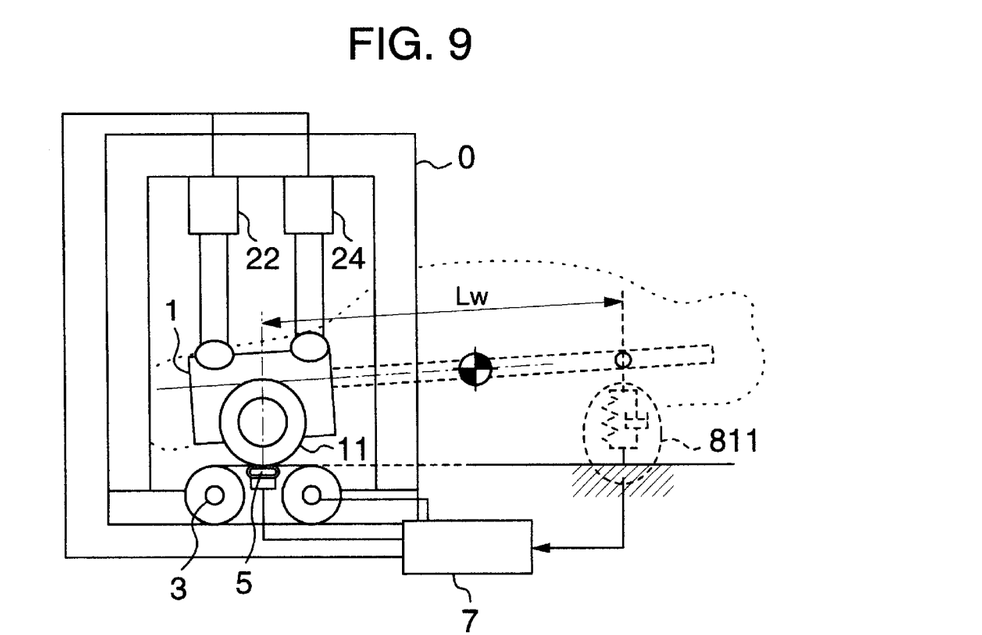
FIG. 9 is a view showing a behavior of a vehicle upon deceleration in a condition in which the component and module dynamic test apparatus in the first embodiment of the present invention is operated.

FIG. 9 shows a decelerating test condition in the test apparatus according to the present invention. The dummy chassis 1 suspended from the frame 0 by actuators 22, 23, 24, 25 (actuators 23, 25 are invisible in this figure, and further, in order to avoid complication, only actuators for carrying out a pitch displacement are shown).

The tire 11 of the front left wheel assembly 10 confronts the flat belt 3, and a ground contact load thereof can be detected by the load detecting device 5. In the case of deceleration, it is required that the flat belt 3 is driven being controlled by the digital computer 7 in such a condition as to reflect the test condition. The load and the attitude are reproduced by steps (1) to (20), and in the case of deceleration, a braking force is effected, contrary to drive force in the case of acceleration, in which a drive force is effected. Thus, a load variation occurs from the rear wheels to the front wheels, during testing, and the load is larger than the static front wheel load. Accordingly, the dummy chassis 1 dives forward, when advancing is made in the positive X-axial direction.

Next, in this embodiment, estimating that the front left wheel assembly 10 is that of a four wheel drive vehicle, and the dummy chassis 1 is set up in such a condition that an engine, a transmission and the like are installed in a vehicle in order to test a left cornering characteristic. This is also a general example. Accordingly, in the case of a rear wheel drive vehicle, it can be considered that the drive force of the front wheel becomes zero while in the case of a front wheel drive vehicle, it can be considered that the drive force of the rear wheel becomes zero. In this embodiment, the flat belt 3 is driven being controlled by the digital computer 7 in accordance with a test condition, that is, the front left wheel assembly 10 serves as a driven wheel which is driven by the flat belt 3. Further, for the sake of brevity, estimation is made that the longitudinal load variation is negligible.

The tire 11 rotates the flat belt 3 by a power from the engine, in a condition such that the front left wheel assembly 10 is steered to the left, similar to the left cornering of a normal vehicle, and at this time, the balance of forces of the flat belt 3 and the wheel 11 falls in a condition shown in FIG. 2. As mentioned above, a crosswise force applied to the flat belt 3 from the tire 11 can be detected. Accordingly, with the use of the thus detected crosswise force, the load variations of the left and right wheels can be computed. The load variations are inputted to the digital computer 7, serving as inputs to a virtual right wheel suspension assembly model 812 (refer to FIG. 6) which has been determined by a right wheel static load, dimensions of the suspension, spring constants of springs, and a damping coefficient of a damper, which is stored in the numerical model storage means 8 together with other numerical models. The digital computer 7 computes how the stroke of the virtual right wheel suspension which is an arithmetic numerical model varies, depending upon the load variation. Further, an alignment variation of the suspension tire can be computed from a numerical model such as a suspension arm or the like. With this arrangement, a force for turning a vehicle can be computed from the crosswise force of the right wheel.

During actual running of the vehicle, the resultant of a crosswise force of the left wheel and that of the right wheel turns the vehicle while balance with a centrifugal force. On the test apparatus, a crosswise component of a force with which the dummy chassis 1 is to be retained by the actuators, corresponds to the centrifugal force. For example, the position of the dummy chassis 1 is detected by the displacement sensors of the actuators so as to control the actuators in order to hold the chassis 1 always at one and the same position, and accordingly, a condition in which the dummy chassis 1 is applied with a centrifugal force can be simulated.

Similar to the above-mentioned rectilinear acceleration test, it is required to compute again the above-mentioned procedures (computation of a load variation, suspension alignment and the like), from the resultant crosswise force of a crosswise force by the left wheel and a crosswise force by the right wheel. Further, it is required to materialize an attitude (rolling) of the dummy chassis computed on the basis of the computed attitude of the vehicle with the use of the actuators. When rolling of the vehicle is effected, the height of gravitational center varies, and accordingly, compensation therefore is also required. Further, in the rotary system, it is required to apply a force equal to the drive force of the right wheel to the flat belt chassis dynamo. In this case, for the same of brevity, a variation in the drive force from the rear wheel is eliminated, but a variation in the drive force from the rear wheel can be taken into consideration with the use of steps similar to those during the above-mentioned rectilinear acceleration.

Figure 10:
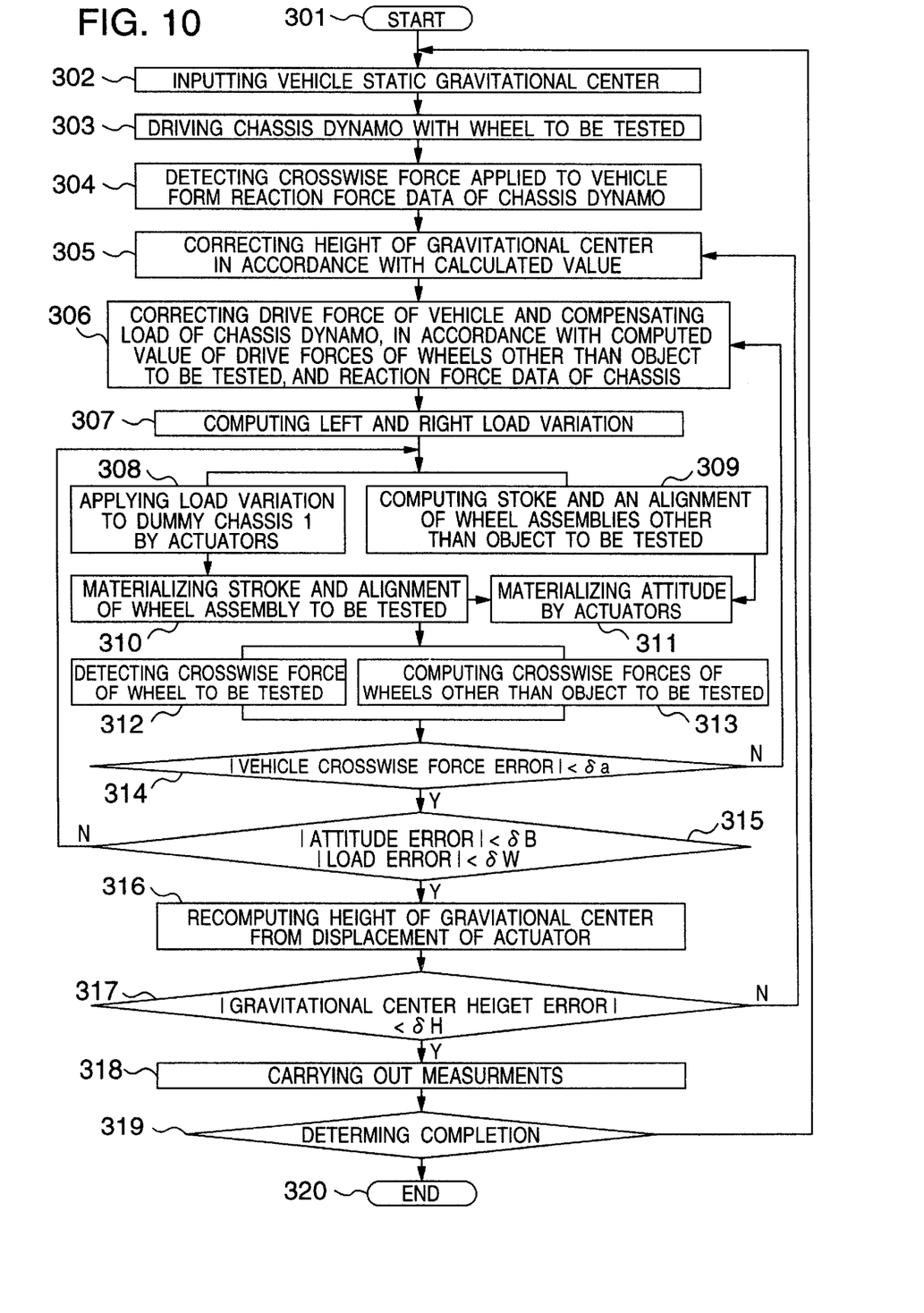
FIG. 10 is a flow chart showing a cornering test carried out by the component and module dynamic test apparatus in the first embodiment of the present invention.

Further, since flows of the above-mentioned events complicatedly react with each other, irritation of computation and irritation of compensation are required, which are shown step by step in FIG. 10. Explanation will be made of a test method according to the present invention will be explained with reference to this figure.

(21) Start (step 301);

(22) Inputting a static gravitational center of a vehicle as positional data to the digital computer 7, and simultaneously applying a static load of a wheel to be tested (front left wheel in this embodiment), which is stored in the numerical model storage means 8, to the dummy chassis 1 by means of the actuators (step 302);

(23) Driving the chassis dynamo with the wheel to be tested (step 303);

(24) Detecting a crosswise force produced from the wheel to be tested from reaction force data of the chassis dynamo, and computing a crosswise force exerted to the overall vehicle (step 304);

(25) Correcting the height of the gravitational center in accordance with a computed value of a dynamic gravitational center (step 305);

(26) Computing arithmetic crosswise forces of wheels (right side wheels in this embodiment) other than the wheel to be tested, and a crosswise force produced from the wheel to be tested from the reaction force data of the chassis dynamo driven by the wheel to be tested, computing a crosswise force applied to the vehicle from the resultant of the afore-mentioned crosswise forces, and adjusting the load of the chassis dynamo as necessary (step 306);

(27) Computing load variations of the left and right wheels with the use of tread data stored in the numerical model storage means 8 by means of the digital computer 7 (step 307);

(28) Applying a load to the dummy chassis 1 by means of the actuators (step 308);

(29) Computing a stroke (Xfr, refer to FIG. 6) and an alignment from data of spring elements and damping elements of a virtual suspensions, which are stored in the numerical model storage means 8 (step 209);

(30) Reproducing a stroke (Xfl, refer to FIG. 6) of the wheel assembly to be tested, and the alignment (step 310);

(31) Reproducing an attitude (a roll angle based upon Formula 13) by means of the actuators (step 311);

(32) Detecting a crosswise force by the wheel to be tested, with respect to the attitude (step 312);

(33) Computing crosswise forces by wheels other than the wheel to be tested, from data of virtual suspenion tires and the like, which are stored in the numerical model storage means 8, with respect to the attitude obtained by step 311 by means of the digital computer (step 313);

(34) Comparing an error between the initial crosswise force of the vehicle and the crosswise force of the vehicle, which has been recomputed from the resultant crosswise forces obtained by steps 311, 312, with a predetermined reference value δF (step 314);

(35) Comparing an error between the initial load and the load variation (can be detected by the load measuring device 5) obtained by step 308 and applied to the dummy chassis 1, with a predetermined reference value δW, and by comparing an error between the original attitude of the vehicle and the attitude of the dummy chassis 1 obtained at step 311 with a predetermined reference value δB (step 315);

(36) Computing an attitude of the vehicle from displacements of the actuators detected by the displacement detectors incorporated in the actuators, and computing again the height of the gravitational center of the vehicle body (step 316);

(37) Comparing an error between the initial height of the gravitational center and the recomputed height of the gravitational center of the vehicle body, with a reference value δH (step 317);

(38) Carrying out measurements (at this point, the irritation of computation and correction have been completed, and accordingly, the assembly to be tested is operated in a condition near to an actual running condition of the vehicle) (step 318);

(39) Determining completion (step 319); and (40) End (step 320).

The determination of completion is made by determining whether a predetermined time has elapsed or not, or whether a rest signal is delivered to the vehicle dynamic test apparatus or not.

Figure 11:
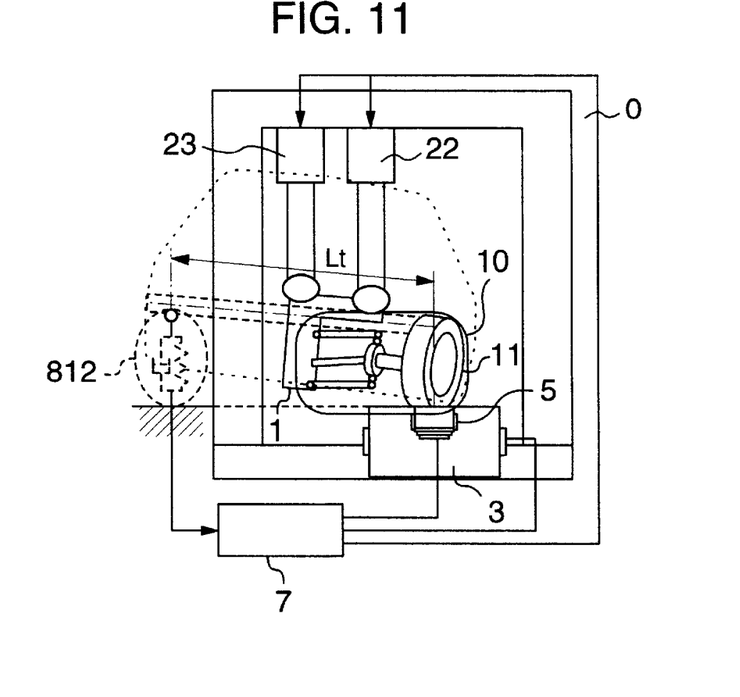
FIG. 11 is a view showing a behavior during a right cornering test in a condition in which the component and module dynamic test device in the first embodiment of the present invention is operated.

FIG. 11 shows a cornering test condition in the test apparatus according to the present invention. The dummy chassis 1 is suspended from the frame 0 by actuators 22, 23, 24, 25 (actuators 23, 25 are invisible in this figure, and further, in order to avoid complication, only actuators required for carrying out a pitch displacement are shown).

The tire 11 of the front left wheel assembly 10 confronts the flat belt 3, and a ground contact load thereof can be detected by the load detecting device 5. The load and the attitude are reproduced by steps (21) to (40) as mentioned above, and various measurements for the front left wheel 10 can be carried out. At this time, the load becomes smaller than the static front left wheel load, and accordingly, the dummy chassis 1 is inclined upward and leftward.

Figure 12:
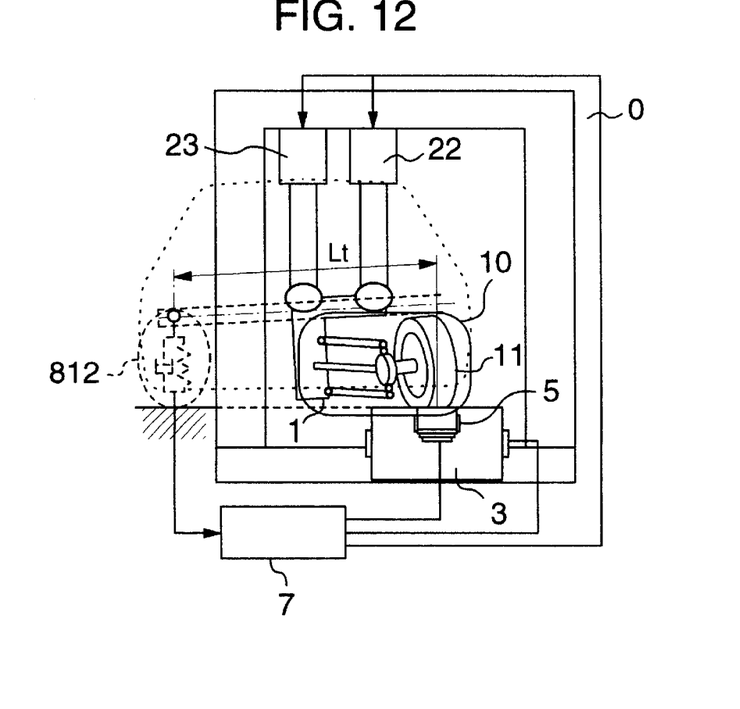
FIG. 12 is a view showing a behavior during a left cornering test in a condition in which the component and module dynamic test device in the first embodiment of the present invention is operated.

FIG. 12 shows a cornering test condition in the test apparatus according to the present invention. The dummy chassis 1 is suspended from the frame 0 by actuators 22, 23, 24, 25 (actuators 23, 25 are invisible in this figure, and further, in order to avoid complication, only actuators for carrying out a pitch displacement are shown).

The tire 11 of the front left wheel assembly 10 confronts the flat belt 3, and a ground contact load thereof can be detected by the load detecting device 5. The load and the attitude are reproduced by steps (21) to (40) as mentioned above, and various measurements for the front left wheel 10 can be carried out. At this time, the load becomes larger than the static front left wheel load, and accordingly, the dummy chassis 1 is inclined downward and leftward.

Figure 13:
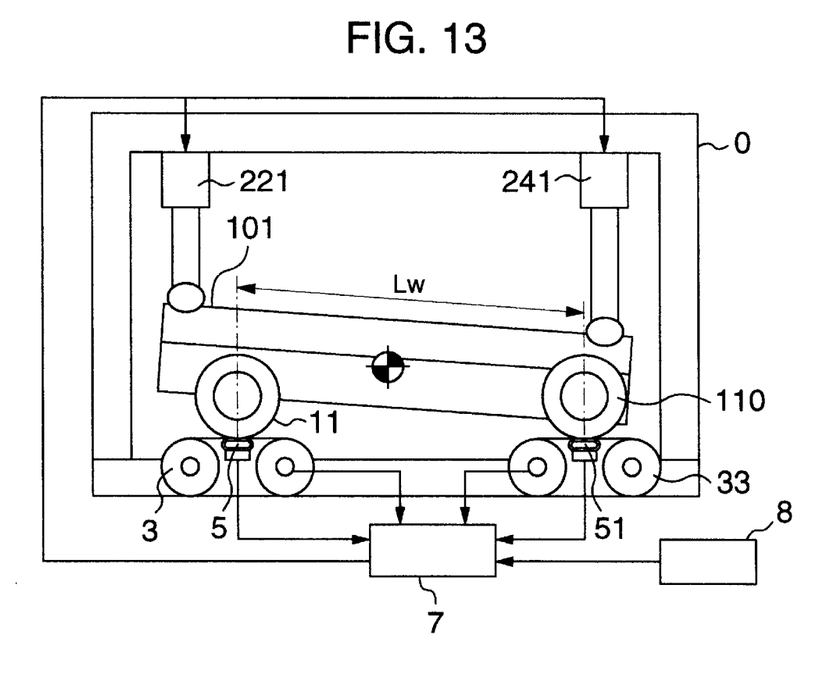
FIG. 13 is a schematic view illustrating an overall arrangement of a second embodiment of the present invention.
Figure 14:
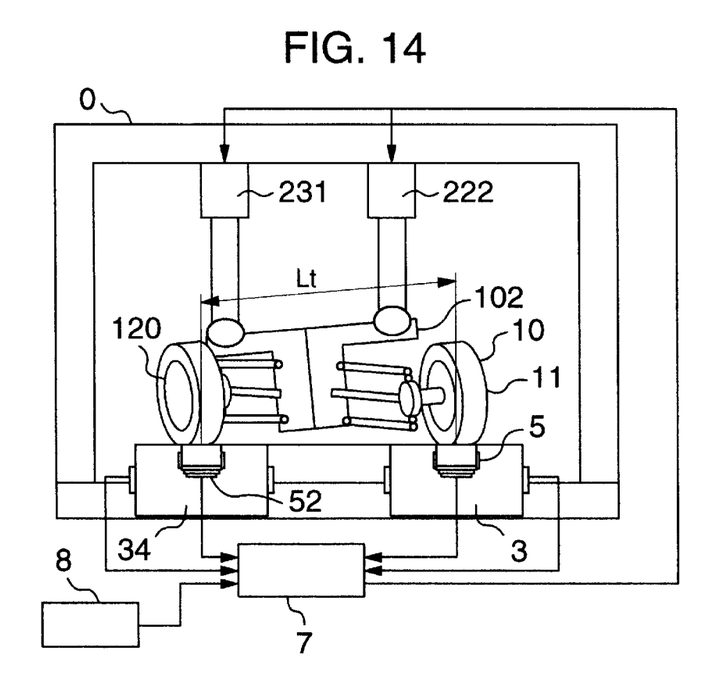
FIG. 14 is a schematic view illustrating an overall arrangement of a third embodiment of the present invention.

FIGS. 13 and 14 are views which show respectively a second and a third embodiment of the present invention. Although it has been explained in the first embodiment that only the front left wheel assembly is set up to the dummy chassis 1 for testing, all wheel assemblies may be set up to the dummy chassis 101 for testing, as shown in FIG. 13 (some wheels are not visible in this figure). Further, as shown in FIG. 14, the front wheel assemblies or the rear wheel assemblies may be set up to the dummy chassis 102 for testing. In these cases, it is desirable that the number of the wheel assemblies to be set up is equal to that of flat pelt chassis dynamos.

In the foregoing description there has been explained, in the embodiments of the test apparatus according to the present invention, the method in which measured values obtained by a running test for components to be tested and a module on a test bench such as a flat belt type chassis dynamo, and computation on the basis of numerical models of components other than the components to be tested and the module are related to one another, and accordingly, a condition near to an actual running condition is reproduced for the components to be tested and the module in order to analyze, in detail, how the components to be tested and the module affect upon the motion of the overall vehicle during actual running of the latter. In the above-mentioned embodiments, although it has been explained that pitching, rolling and the like are produced, independent from each other, they may, of course, be produced in combination with one another so as to cope with variation in the motion of the vehicle. In such a case, the digital computer 7 computes drive signals for the actuators so that the actuators are operated, in coordination with one another. Even though yawing occurs in combination with pitching and rolling, the concept of the present invention can be applied. That is, variations in crosswise forces of all rear wheels are measured or computed, and then, the dummy chassis is retained by the actuators in such a condition that it has an arbitrary angle with respect to the flat belt, thereby it is possible to simulate the yawing while the balance of forces are held.

The arrangement of the actuators possibly cause occurrence of a situation that a load variation and an alignment variation of tires completely the identical to that during actual running of a vehicle cannot be reproduced. However, it is possible to perform dynamic performance tests with an extremely high degree of accuracy in comparison with a conventional test in which they are tested on a flat belt or rollers, being applied with a static load without considering a variation in the behavior of a vehicle.

In the above-mentioned embodiments, the component to be tested has a tire (wheel), but it is possible to vibrate the component excluding the tire with the use of an vibrator instead of the flat belt. In this arrangement, the vibrator is preferably driven so as to simulate a shock from a road surface. In this arrangement, the vibrator may be considered to be a means for simulating a road surface.

Computation based upon numerical models of components other than a component to be tested and a module, and measured values for the component to be tested, and the module on a test bench such as a flat belt type chassis dynamo are related to one another so as to reproduce a condition near to an actual running condition for the component to be tested and the module, and accordingly, it is possible to analyze how the component to be tested and the module affect the motion of the overall vehicle during actual running of the vehicle.

What is claimed is:

1. A vehicle component dynamic test apparatus, comprising:

a frame supported on a base;

a plurality of actuators connected to said frame, for supporting a dummy chassis which carries thereon a component of said vehicle to be tested including at least one wheel;

a dummy road surface means for supporting the base and having a dummy road surface adapted to simulate a road surface on which the vehicle runs;

a first control means for the dummy road surface;

a reaction force measuring means for measuring a reaction force produced when the wheel of the component makes contact with the dummy road surface;

an attitude detecting means comprising displacement detectors provided respectively for each of the-actuators, for detecting an attitude of the dummy chassis with respect to the frame;

second control means for the actuators;

numerical model storage means for storing numerical models of the vehicle; and a computer electrically coupled to said reaction force measuring means, said numerical model storage means, said attitude detecting means and said first and second control means for computing an attitude of the dummy chassis and a load applied to the road surface from each of wheels of the vehicle, from a measured reaction force delivered from the reaction force measuring means with the use of the numerical models stored in the numerical mode storage means, and for delivering instruction signals to the second control means for the actuators and the first control means for the dummy road surface means so as to decrease a difference between the attitude of the dummy chassis detected by the attitude detecting means and the computed attitude of the dummy chassis, and to decrease a difference between a load applied to the dummy road surface, which is obtained from the reaction force of the wheel corresponding to the component to be tested, measured by the reaction force measuring means, and the calculated load which would be applied to the road surface by the first wheel corresponding to the component.

2. A vehicle component dynamic test apparatus as set forth in claim 1, wherein said reaction force measuring means can measure said reaction force from decomposed components longitudinal, crosswise and vertical of the road surface.

3. A vehicle component dynamic test apparatus as set forth in claims 1 or 2, wherein if the reaction force measuring means measures a longitudinal component from the dummy road surface, a rotational displacement about a rotary axis crosswise of the dummy road surface is preferably applied to the dummy chassis by the actuators.

4. A vehicle component dynamic test apparatus as set forth in claim 1, wherein if the reaction force measuring means measures a crosswise component from the dummy road surface, an angular displacement about a rotary axis longitudinal of the dummy road surface is applied to the dummy chassis by the actuators.

5. A vehicle component dynamic test apparatus as set forth in claim 1, wherein the dummy road surface is formed of a flat-belt type chassis dynamo, and the reaction force measuring means measures a longitudinal reaction force of the dummy road surface as a value which is computed from rotating data including a rotational inertia of the flat-belt type chassis dynamo, an absorbing/generating torque, a rotational speed, and an angular acceleration of a motor/generator for driving the chassis dynamo.

6. A vehicle component dynamic test apparatus according to claim 1, wherein the computer is a digital computer.

7. A dynamic test method for a component of a vehicle, comprising the steps of: supporting a dummy chassis with a plurality of actuators connected to a frame; supporting the component of the vehicle as an object to be tested, which component includes at least a first wheel, on the dummy chassis; calculating forces produced by second wheels other than the first wheel corresponding to the component, and calculating a force generated from the first wheel as an object to be tested, from at least either one of data of reaction on a dummy road surface and data of rotation of the dummy road surface, and calculating a force acting upon the vehicle from a resultant force of these forces generated at the first wheel and the second wheels; calculating a load effected at the first wheel; and loads effected at the second wheels, with the use of a numerical model of the vehicle; driving the actuators so as to apply the thus calculated loads to the first wheel in order to establish a stroke and an alignment of an assembly of the first wheel; calculating strokes and alignments of assemblies of the second wheels, with the use of the numerical model of the vehicle; and driving the actuators in accordance with the stroke and the alignment of the assembly of the first wheel, which have been established, and the stroke and the alignments of the second wheels other than the first wheel, which have been calculated, so as to adjust an attitude of the dummy chassis to an attitude of the vehicle.

8. A step as set forth in claim 7, wherein the attitude of the dummy chassis is detected by detecting displacements of each of the actuators.

9. A vehicle component dynamic test apparatus, comprising:

a frame supported on a base;

a plurality of actuators connected to said frame, which support a dummy chassis which carries thereon a component of said vehicle to be tested including at least one wheel;

a dummy road surface simulator supported on the base and having a dummy road surface adapted to simulate a road surface on which the vehicle runs;

a first control device for the dummy road surface;

a reaction force measuring element which measures a reaction force produced when the wheel of the component makes contact with the dummy road surface;

an attitude detecting device comprising displacement detectors provided respectively for each of the actuators, which detects an attitude of the dummy chassis with respect to the frame;

a second control device for the actuators;

a numerical model storage device which stores numerical models of the vehicle; and a computer electrically coupled to said reaction force measuring device, said numerical model storage device, said attitude detecting device and said first and second control devices for computing an attitude of the dummy chassis and a load applied to the road surface from each of wheels of the vehicle, from a measured reaction force delivered from the reaction force measuring device with the use of the numerical models stored in the numerical model storage device, and for delivering instruction signals to the second control device for the actuators and the first control device for the dummy road surface simulator so as to decrease a difference between the attitude of the dummy chassis detected by the attitude detecting device and the computed attitude of the dummy chassis, and to decrease a difference between a load applied to the dummy road surface, which is obtained from the reaction force of the wheel corresponding to the component to be tested, measured by the reaction force measuring device, and the calculated load which would be applied to the road surface by the first wheel corresponding to the component.

10. A vehicle component dynamic test apparatus according to claim 9, wherein the computer is a digital computer.

* * * * *